Figure 1:
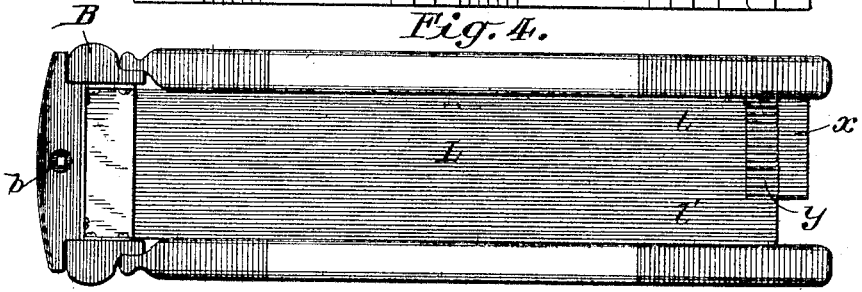

No. 856,861. PATENTED JUNE 11, 1907.
J. F. GLOE.
LOOSE LEAF INDEXED LEDGER.
APPLICATION FILED MAY 22, 1906.

3 SHEETS—SHEET 1.

WITNESSES

INVENTOR
JOHN F. GLOE.
BY
ATTORNEYS

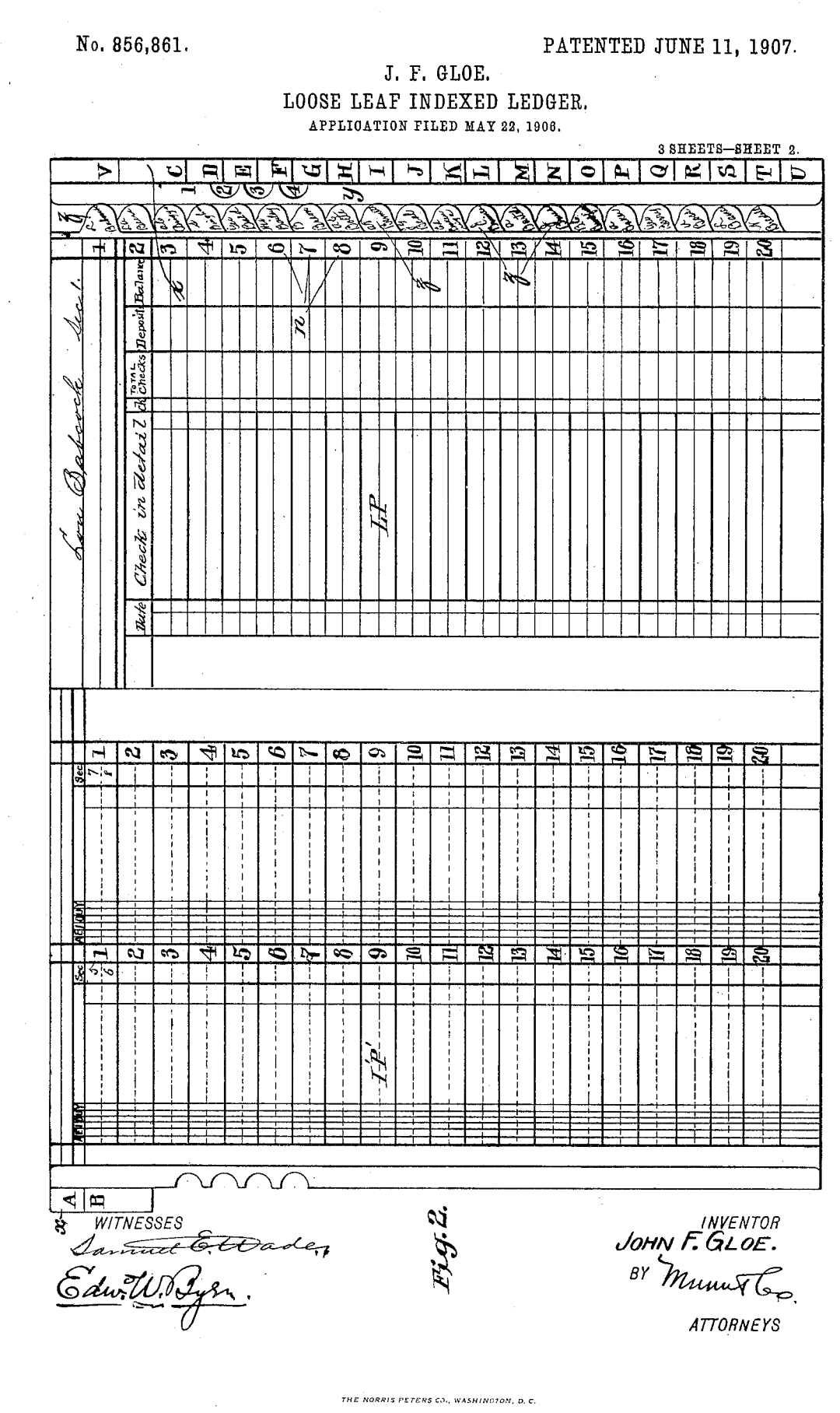

No. 856,861. PATENTED JUNE 11, 1907.
J. F. GLOE.
LOOSE LEAF INDEXED LEDGER.
APPLICATION FILED MAY 22, 1906.

3 SHEETS—SHEET 2.

Fig. 2.

INVENTOR
JOHN F. GLOE.

WITNESSES

BY

ATTORNEYS

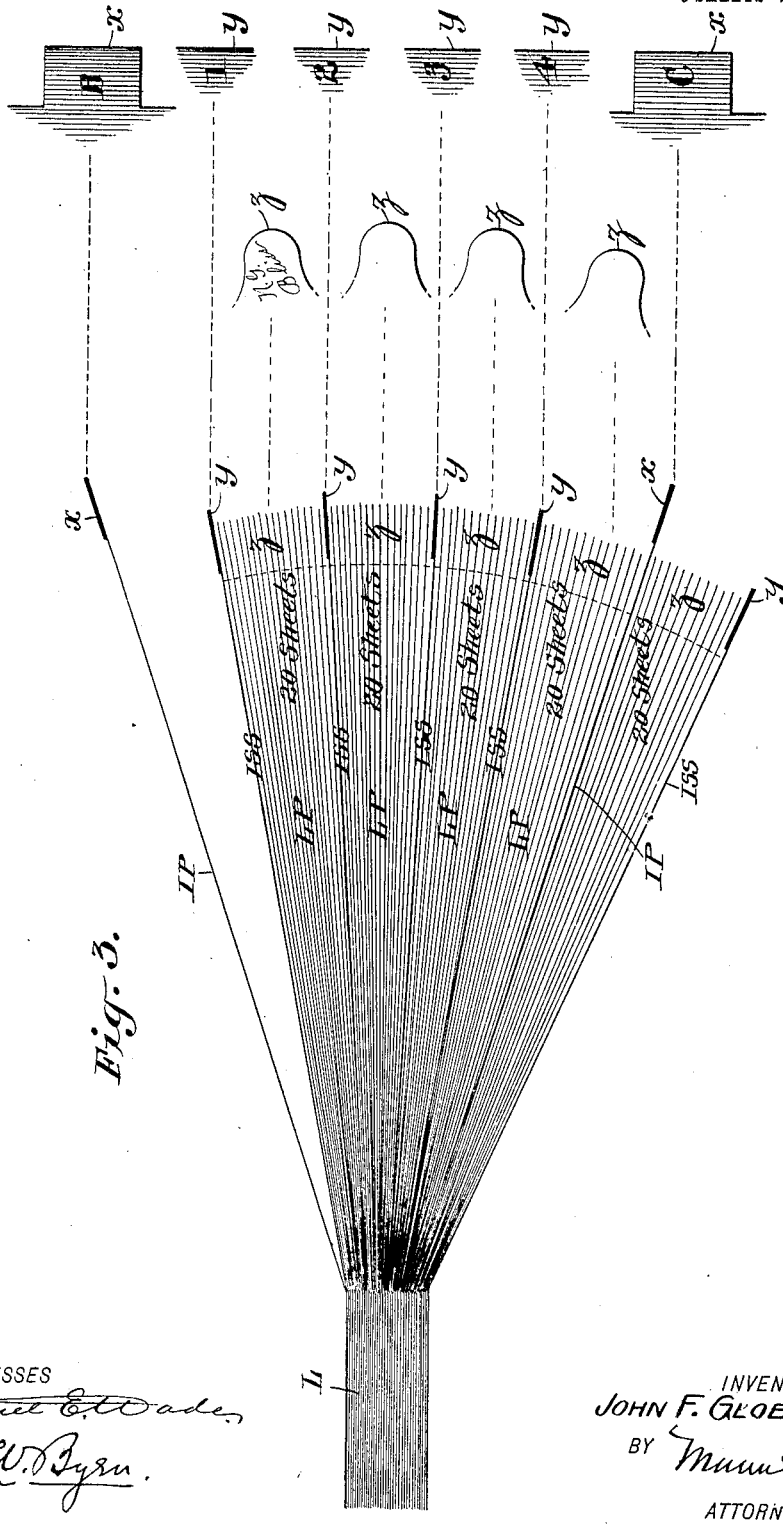

UNITED STATES PATENT OFFICE.

JOHN F. GLOE, OF MANNING, IOWA.

LOOSE-LEAF INDEXED LEDGER.

No. 856,861.  Specification of Letters Patent.  Patented June 11, 1907.

Application filed May 22, 1906. Serial No. 318,179.

*To all whom it may concern:*

Be it known that I, JOHN F. GLOE, a citizen of the United States, residing at Manning, in the county of Carroll and State of Iowa, have invented a new and useful Improvement in Loose-Leaf Indexed Ledgers, of which the following is a specification.

My invention is in the nature of a novel form of indexed ledger of the form known as loose leaf ledgers, in which removable and interchangeable leaves are firmly held together in a temporary mechanical binder.

The object of my invention is to make the ledger self indexing and capable of indefinite extension and to facilitate the reference to the various accounts, thus saving much valuable time for the bookkeeper.

It consists in the novel construction and arrangement of the index and ledger pages with their tabs and various reference markings, as will be hereinafter fully described with reference to the drawings, in which Figure 1 represents one of the series of index pages, as opened at the letter B. Fig. 2 represents the book opened with the back side of an index page shown on the left and a ledger page on the right. Fig. 3 is an edge view of the pages as they exist between the index letter B and the next letter C, the pages being divergently separated at their tab edges to show the subdivisions of pages for each initial letter. Fig. 3ª is a diagrammatic extension of the page edges shown in Fig. 3, the page edges being shown in fragmental face views set immediately opposite the corresponding sections shown in Fig. 3 and Fig. 4 is a bottom edge view of the book with the detachable loose ledger leaves bound together in a mechanical binder or book back.

Referring to Fig. 4, L represents the loose ledger leaves which are detachably and interchangeably locked in a binder or back B of any of the usual forms through the agency of a key operating upon the squared shaft $b$. I make no claim to the construction of this binder, and any desired form of binder may be employed to hold the leaves L. The leaves in the book are divided into two sets, the first ones $l$, Fig. 4, being those that are in actual use bearing names and accounts, while those shown at $l'$, in the rear of the book, are leaves properly ruled and provided with suitable headings which constitute the reserve stock from which a leaf may be taken and after having a fresh name inserted thereon is inserted in its proper place in the group $l$.

The leaves of the ledger are divided into two principal kinds, the index page I P shown in face view in Fig. 1 and back view I' P' on the left of Fig. 2, and the ledger page L P shown on the right of Fig. 2. These pages are arranged in groups each group extending from one initial letter to the next, thus, as shown in Figs. 3 and 3ª, the group illustrated is the B-group occurring between the index letter B and the next index letter C and it will be understood that this same arrangement occurs between C and D and all the other letters of the alphabet. Each main letter group is divided into any desired number of index sections or sub groups. As shown in Figs. 3 and 3ª there are four such sections in the letter B group, but there may be a larger number as hereafter described.

I P Fig. 3, represents the index pages, each of which has on its edge a leather tab $x$ bearing its initial letter. These tabs project a greater distance than usual, as seen at $x$ in Fig. 4, and over-lap other tabs for the sections of the group. These main index tabs have their index letters visible along the edge of the ledger when opened, as seen at $x$ in Figs. 1 and 2 and divide the leaves of the book into main groups, each for a different letter. In each letter group of pages, see Figs. 3 and 3ª, there are two kinds of pages. One I call the ledger pages L P because each page bears the individual ledger account of the customer, as seen in Fig. 2 on the right, and these pages have projecting paper tabs $z$ cut on their edges, which tabs bear the names of the persons whose accounts are on the same page and also numbers $n$ set opposite the tabs. The other sheets I S S, Fig. 3, divide these ledger leaves into groups, here shown as four. These sheets I S S I call index section sheets and their edges are bound with leather which over-laps the thin paper tabs $z$ of the ledger pages as seen in Fig. 3. These index section sheets are marked 1, 2, 3, 4, Figs. 2 and 3ª, so as to divide the group of names into four, or more, sections or sub groups.

With this general description of the arrangement of the ledger, I will now proceed to describe more particularly the rulings and headings of the pages and explain how this is correlated to the grouping of the index and ledger pages.

Referring first to the index page I P, Fig. 1, each page bearing an index letter tab—B for instance—is to be inscribed with the names of the persons which begin with B, and they are entered one after another as the accounts are opened without regard to the vowel classification. The vowel classification is provided for by six vowel columns on the left hand side of the row of name spaces, on which columns at the top are placed the vowels A, E, I, O, U, Y. These vowel columns cross the name spaces at right angles and when any name is entered on its name space the first vowel of that name is checked in its appropriate vowel column. Thus Bennett would have its check in the E column of vowels and Burman in the U column, and for ready reference in finding a name in the index the bookkeeper, after turning to the proper initial letter of the index, runs his finger down the vowel column of the first vowel of the name he seeks, until he finds a check and then glances across to the name, or, if that is not the name sought, he continues running down the vowel column and glances across until he locates the name. The index page has two columns of name spaces, on each page and each column has, as shown, twenty blocks or subdivision numbered consecutively down the page from 1 to 20 and each block two name spaces. There may be, however, more or less than twenty blocks— depending on the length of the ledger. With twenty blocks there is, on any one page, room for eighty names of a given initial letter and with the back side of this page indexed in the same way, as seen on the left of Fig. 2, one hundred and sixty names beginning with that letter may be accommodated. By increasing the number of index leaves this number may be extended indefinitely. On the right hand side of each name space there is a column to receive the initials of the Christian or given name, and also another column which is marked "Sec" and in which is to be placed the numbers indicating the section of the ledger group in which the name is found. Thus the figure 1 occurring after the name Babcock L. means that L. Babcock's account will be found in the first section 1 of the four groups of the letter B and to find immediately the ledger page bearing the account, the bookkeeper takes hold of tab B and opens the book at section 1, as seen at y in Fig. 1, and when opened at this point, the page shown on the right of Fig. 2 appears with the account of L. Babcock in plain view. If, however, the name A. Boss, of Fig. 1 is to be traced, the section number of Boss is seen to be 1 and the book is opened at the same section as before but as the block in which Boss' name appears is 18, the book is first opened at section 1 (at y Fig. 1) and then the bookkeeper runs his eye down to 18 on Fig. 2 (on the third line from the bottom) nd thus locates the paper tab bearing Boss' name. He accordingly takes hold of this tab and opens directly to the account of A. Boss, which will then appear at the top of the page, just as Lou Babcock's name appears at the top of Fig. 2. If any name sought on the index page Fig. 1 has a number 2 after it, this means that such name will be found in section 2, or the second sub group of the B group of names, and all that is necessary to do is to open the book at 2 of the index section sheet I S S and the opening of the book at that page will disclose all the ledger name tabs of that section, and the name is at once identified by the number of the block as before described.

In Figs. 3 and 3ª I have only shown four sections, or sub groups, for each letter, which will accommodate a single index page like Fig. 1, because the first column of names includes sections 1 and 2 and the second column includes sections 3 and 4. If, however, the back side of the index page I P of Fig. 1 is similarly subdivided, as actually shown on the left of Fig. 2, this will permit of eight sections or subgroups for each index letter, and it is obvious that this may also be indefinitely extended. All ledger leaves have a space on the upper right hand corner, for the section number to which the leaf has been assigned. All ledger leaves are numbered, corresponding with numbers on index sheet, next to the tab line; if a name is entered on index sheet under the alphabet letter B on block 10, section 1, a leaf is selected that has the tab opposite number 10 on ledger leaf, and placed in ledger in section 1 under the alphabet letter B. In placing the ledger leaf in the section assigned to it, it may be placed in any part of the section; the tabs on ledger leaves are so cut that the name on ledger leaf tab shows upon opening the book and section in which the account is placed; although leaves may be placed in each section commencing with tab number 1 and so on down until the section is filled. Each ledger leaf is numbered the same as the index sheet, and upon opening the section at any place or any sheet in the section it shows all the numbers on the ledger page to locate the tab number wanted. Ledger leaves may be transferred from one section to another by changing the section number on the upper right hand corner on ledger leaf and also on the index sheet in the block where the name is placed. A customer's name may be placed in any block on the index sheet, and a ledger leaf with index tab corresponding to this block number is selected, and placed in the section where it is assigned to. Tabs on the ledger leaves may be strengthened with linen or other material.

I claim

1. An indexed ledger, comprising leaves divided into main groups, each main group having one alphabetically indexed tab x and each main group being subdivided into sub-groups and each sub-group provided with a numbered sheet I S S and having between these numbered sheets groups of ledger pages L P each page bearing a tab z of sufficient size to receive the name of the person.

2. An indexed ledger, comprising leaves divided into main groups, each main group having one alphabetically indexed tab x and each main group being subdivided into sub-groups and each sub-group provided with a numbered sheet I S S and having between these numbered sheets groups of ledger leaves L P each leaf bearing a tab z of sufficient size to receive the name of a person, said tabs z being covered and protected by the edges of the numbered sheets.

3. An indexed ledger, comprising leaves divided into main groups, each main group having one alphabetically indexed tab x and each main group being subdivided into sub-groups and each sub-group provided with a numbered sheet I S S and having, between these numbered sheets, ledger leaves L P, each leaf bearing a tab z of sufficient size to receive the name of a person and overlaid by the numbered sheets, the alphabetical index tabs x being made to extend beyond the numbered sheets and ledger tabs.

4. An indexed ledger, comprising leaves divided into main groups, each main group having one alphabetically indexed tab x and each main group having at the front an index page I P divided into numbered name spaces, and each main group being subdivided into sub-groups each provided with a numbered sheet I S S, said numbered sheets having between them groups of ledger pages L P each page bearing a tab z of sufficient size to receive the name of a person and also a number for the tab identical with a number in the name spaces of the index page.

5. An indexed ledger, comprising leaves divided into main groups, each main group having one alphabetical index tab x, and each main group having at the front an index page I P divided into blocks that are consecutively numbered, each block further divided into two spaces by a horizontal line; each main group represented by a tab x being also subdivided into sub-groups, each of which sub-groups is provided with an index section sheet I S S, with a thickened and numbered edge y, said index section sheets I S S having between them groups of ledger pages L P, each page bearing a tab z of sufficient size to receive the name of the person and bearing also a number opposite its tab identical with a number in the consecutive series of blocks of the index page I P.

6. An indexed ledger, comprising leaves divided into main groups, each main group having one alphabetical index tab x and each main group having at the front an index page I P divided into a vertical series of blocks that are consecutively numbered, and vertical column designated "Sec", each main group represented by a tab x being also subdivided into sub-groups, each of which sub-groups is provided with an index section sheet I S S with a thickened and numbered edge y, said index section sheets I S S having between them groups of ledger pages L P, each page bearing a tab z of sufficient size to receive the name of the person and bearing also a number opposite its tab identical with a number in the consecutive series of blocks of the index page I P.

7. An indexed ledger having ledger leaves each bearing a tab z of sufficient size to receive the name of the person and bearing also a vertical series of consecutive numbers, a different number being opposite each tab, an index page I P divided into blocks that are consecutively numbered, the numbers of said blocks being identical with the numbers on the ledger leaves bearing the tabs.

JOHN F. GLOE.

Witnesses:
BERT KRAUS,
JACOB OHDE.